(12) United States Patent
Silverman et al.

(10) Patent No.: US 10,320,737 B2
(45) Date of Patent: Jun. 11, 2019

(54) DEVICE AND METHOD FOR TEMPORAL CORRELATION OF COMMUNICATION TYPES

(71) Applicant: Avaya Inc., Santa Clara, CA (US)

(72) Inventors: Jon Silverman, Minneapolis, MN (US); Mehmet Balasaygun, Freehold, NJ (US); Rajeshwari Edamadaka, Allentown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 655 days.

(21) Appl. No.: 14/753,890

(22) Filed: Jun. 29, 2015

(65) Prior Publication Data

US 2016/0380958 A1    Dec. 29, 2016

(51) Int. Cl.
*G06F 15/16* (2006.01)
*H04L 12/58* (2006.01)

(52) U.S. Cl.
CPC .............. *H04L 51/36* (2013.01); *H04L 51/16* (2013.01)

(58) Field of Classification Search
CPC ................................ H04L 51/36; H04L 51/16
USPC ........................................................ 709/206
See application file for complete search history.

(56) References Cited

U.S. PATENT DOCUMENTS

| | | | | |
|---|---|---|---|---|
| 2001/0003202 A1* | 6/2001 | MacHe | ................... | H04L 51/04 713/153 |
| 2003/0065724 A1* | 4/2003 | Clark | ................... | G06Q 10/107 709/206 |
| 2003/0105827 A1* | 6/2003 | Tan | ................... | G06Q 10/107 709/206 |
| 2008/0059587 A1* | 3/2008 | Burtner | ................... | H04L 51/36 709/206 |
| 2010/0115035 A1* | 5/2010 | Malhar | ................... | H04L 51/14 709/206 |
| 2010/0169417 A1* | 7/2010 | Rukman | ................... | H04L 51/36 709/203 |
| 2011/0093544 A1* | 4/2011 | Yasrebi | ................... | G06Q 10/107 709/206 |
| 2011/0231499 A1* | 9/2011 | Stovicek | ................... | H04M 1/72547 709/206 |
| 2012/0084377 A1* | 4/2012 | Lee | ................... | H04L 51/00 709/206 |
| 2012/0124147 A1* | 5/2012 | Hamlin | ................... | H04L 51/36 709/206 |
| 2012/0210334 A1* | 8/2012 | Sutedja | ................... | G06Q 10/107 719/314 |

(Continued)

*Primary Examiner* — Hee Soo Kim (57) ABSTRACT

A device and method temporally correlates communication types. The method performed by a first electronic device includes receiving a first message in a first communication format from a second electronic device, the first message having first metadata associated therewith. The method includes determining respective second metadata associated with existing conversations. The existing conversations each include a plurality of existing messages in at least one second communication format. The existing messages are a thread in a temporal order. The existing conversations are shown in a single, respective user interface. The method includes determining a correlation between the first message and one of the existing conversations based upon the first and second metadata. The method includes inserting the first message in the existing messages of the one of the existing conversations that maintains the temporal order.

20 Claims, 4 Drawing Sheets

(56) References Cited

U.S. PATENT DOCUMENTS

| | | | |
|---|---|---|---|
| 2013/0110953 A1* | 5/2013 | Sutedja | G06Q 10/107 709/206 |
| 2014/0245178 A1* | 8/2014 | Smith | H04L 51/16 715/753 |
| 2016/0072755 A1* | 3/2016 | Su | H04L 51/16 709/206 |
| 2016/0344679 A1* | 11/2016 | Lane | G06F 17/212 |

* cited by examiner

DEVICE AND METHOD FOR TEMPORAL CORRELATION OF COMMUNICATION TYPES

BACKGROUND INFORMATION

An electronic device may be configured to connect to one or more networks that enable communications to be performed with other devices connected to these networks. Accordingly, the electronic device may be configured with various communications applications that enable the electronic device to be communicatively connected to another electronic device. For example, one of the communications applications may be configured for a real-time communications such as a telephone call in which audio data is exchanged between users of the communication.

The electronic device may further be configured with further forms of communications. For example, the electronic device may have an instant messaging functionality in which text messages may be transmitted to/from the electronic device to at least one further electronic device. In another example, the electronic device may have a voice mail functionality in which a voice message may be transmitted to/from the electronic device to at least one further electronic device. The text message and/or the voice message may be stored for the user to check at a subsequent time. However, because these functionalities are separate applications, the user of the electronic device is required to access each application to retrieve the messages being held therein.

Furthermore, in view of the various forms of communications applications, the users may select to utilize more than one form. However, the messages being transmitted in these various forms may be associated with a single conversation. Again, in view of being separate applications, these messages require multiple interfaces to be used as well as possibilities of being out of sequence due to the non-real-time nature of instant messaging and voice mails.

SUMMARY OF THE INVENTION

The present invention relates to a method comprising: receiving, by a first electronic device, a first message in a first communication format from a second electronic device, the first message having first metadata associated therewith; determining, by the first electronic device, respective second metadata associated with existing conversations, the existing conversations each including a plurality of existing messages in at least one second communication format, the existing messages being a thread in a temporal order, the existing conversations being shown in a single, respective user interface; determining, by the first electronic device, a correlation between the first message and one of the existing conversations based upon the first and second metadata; and inserting, by the first electronic device, the first message in the existing messages of the one of the existing conversations that maintains the temporal order.

The present invention relates to an electronic device comprising: a transceiver configured to establish a connection to a network; and a processor configured to receive a first message in a first communication format from a second electronic device, the first message having first metadata associated therewith, the processor configured to determine respective second metadata associated with existing conversations, the existing conversations each including a plurality of existing messages in at least one second communication format, the existing messages being a thread in a temporal order, the existing conversations being shown in a single, respective user interface, the processor configured to determine a correlation between the first message and one of the existing conversations based upon the first and second metadata, the processor configured to insert the first message in the existing messages of the one of the existing conversations that maintains the temporal order.

The present invention relates to a non-transitory computer readable storage medium with an executable program stored thereon of a first electronic device, wherein the program instructs a microprocessor to perform operations comprising: receiving a first message in a first communication format from a second electronic device, the first message having first metadata associated therewith; determining respective second metadata associated with existing conversations, the existing conversations each including a plurality of existing messages in at least one second communication format, the existing messages being a thread in a temporal order, the existing conversations being shown in a single, respective user interface; determining a correlation between the first message and one of the existing conversations based upon the first and second metadata; and inserting the first message in the existing messages of the one of the existing conversations that maintains the temporal order.

DETAILED DESCRIPTION

The exemplary embodiments may be further understood with reference to the following description and the related appended drawings, wherein like elements are provided with the same reference numerals. The exemplary embodiments are related to a device and method for generating a single user interface including messages of a first type of communication format and inserting at least one message of a second type of communication format. Specifically, the exemplary embodiments provide a mechanism in which instant messaging (IM) messages are included as a thread in the user interface (e.g., listed in chronological order) and voice mail (VM) messages associated with the IM messages (via analysis of metadata) are temporally correlated and inserted accordingly within the IM messages. Accordingly, a single user interface is used for an entire conversation in which the messages that may be of any communication format are incorporated. The user interface, the messages, the communication formats, the metadata, and a related method will be described in further detail below.

The exemplary embodiments describe a mechanism in which a VM message is analyzed and inserted into a threaded IM conversation to which it has a relationship. This enables a user to have a VM message threaded into the IM conversation providing a single integrated user experience for reviewing messages sent via different communications channels (i.e., communication formats or types) and between/among a common subset of participants on a single subject. The VM message may be listened through the IM application user interface as well as responded to using standard IM communications methods. As will be described in further detail below, the IM messages and the VM messages may have metadata associated therewith that provides a basis in which the correlation or relationship is determined as well as the manner of integration.

Initially, a conversation may be defined as consisting of a set of messages exchanged between a set of users (e.g., two or more users) on a given subject where the subject may provide a basis upon which the conversation is generated and maintained. Thus, the set of users may increase and decrease over time for a given conversation. The set of messages may be where each of the messages is sent by one user to the other users of the conversation. Each message may have an associated date/time when it was originated which creates a time based relationship on all of the messages within the thread. The messages of the conversation are described herein for the exemplary embodiments as text messages as is historically used. However, it should be noted that the use of the text messages in the IM messages is only exemplary. Those skilled in the art will understand that the exemplary embodiments may utilize any type of messages or communication formats such as proprietary messaging systems, multi-media messages (e.g., text, voice, video, pictures, documents, combinations thereof, etc.), etc. It should also be noted that an exemplary case is described herein where a VM message is inserted into a thread of IM messages. However, those skilled in the art will understand that the thread of IM messages may further incorporate the different types of formats and the inserting of the VM message may also be for different formats of messages such as Short-Messaging-Service (SMS), snapchat, call recording, etc.

Figure 1:
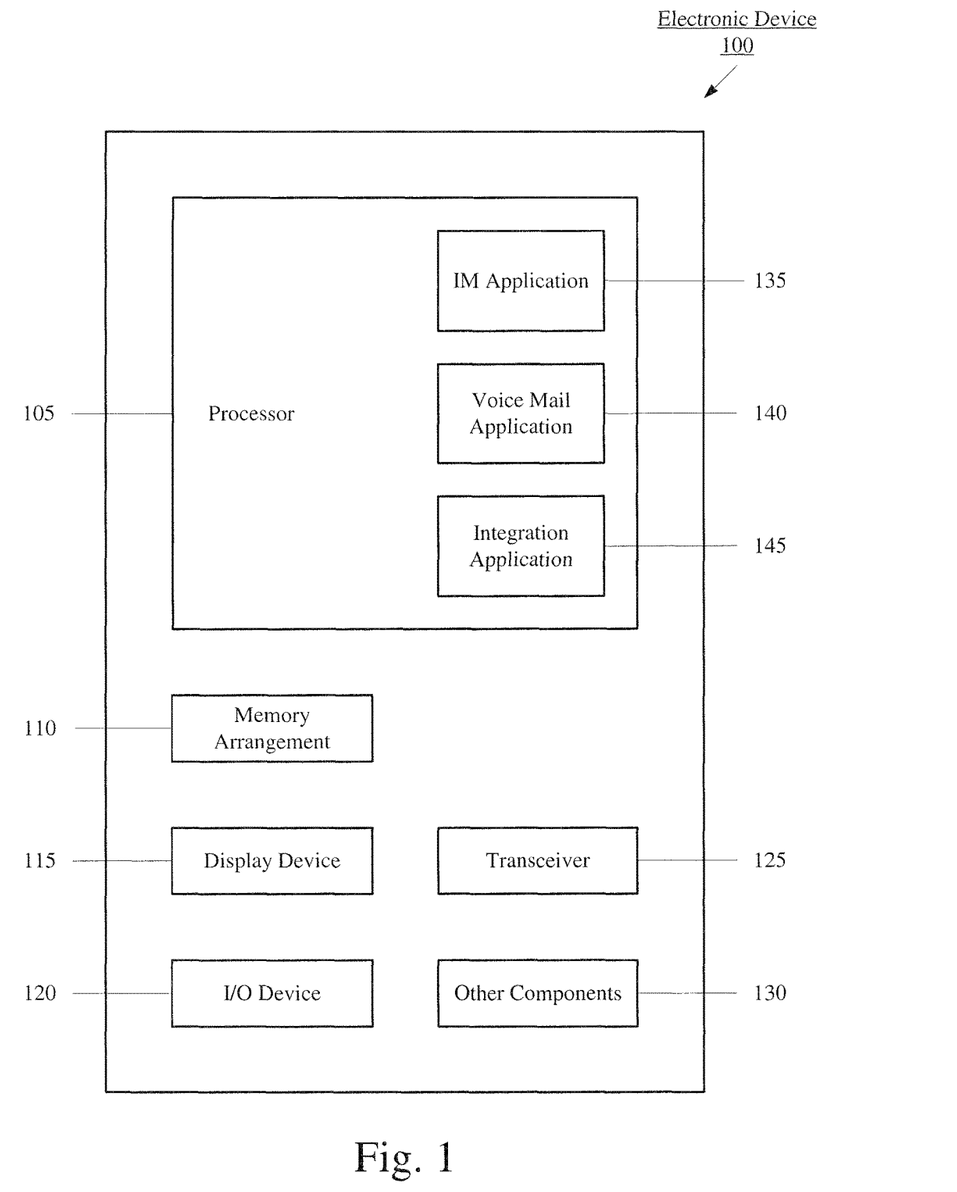
FIG. 1 shows an exemplary electronic device according to the present invention.

FIG. 1 shows the exemplary electronic device 100 according to the present invention. The electronic device 100 may be a device that is configured to establish a connection to at least one communication network. The electronic device 100 may represent any electronic device that is configured to perform the functionalities described herein. For example, the electronic device 100 may be a portable device such as a tablet, a laptop, a smart phone, etc. In another example, the electronic device 100 may be a stationary device such as a desktop terminal. In yet another example, the electronic device 100 may be used as a component in a contact center or a customer service center and more generally to an enterprise's unified communications system or between enterprises where an interaction may be performed between one or more agents thereof and/or one or more customers. The electronic device 100 may include a processor 105, a memory arrangement 110, a display device 115, an input/output (I/O) device 120, a transceiver 125, and other components 130 (e.g., an audio input device (for use with outbound voice related applications), an audio output device (for use with inbound voice related applications), a battery, a data acquisition device, ports to electrically connect the electronic device 100 to other electronic devices, etc.).

The processor 105 may be configured to execute a plurality of applications of the electronic device 100. For example, according to the exemplary embodiments, the electronic device 100 may execute a web browser application when connected to the network via the transceiver 125. In another example, the electronic device 100 may execute a voice communication functionality such as a phone call in which a real-time communication may be established with at least one further electronic device through the connection with the network.

In yet another example, according to the exemplary embodiments, the electronic device 100 may execute an IM application 135 that enables near-real-time communications in an instant messaging format such that IM messages are exchanged with at least one further electronic device through the connection with the network. As discussed above, the IM application 135 may generate a thread of the IM messages in a predetermined temporal order (e.g., chronological). The IM messages may be text based messages that are generated via the I/O device 120 for IM messages made by the user of the electronic device 100 and are read via the display device 115 for IM messages received by the user of the electronic device 100. The IM application 135 may generate a plurality of threads based upon participating users of the conversation. For example, a first thread may include the user of the electronic device 100 and a first user using a first electronic device. In another example, a second thread may include the user of the electronic device 100, a second user using a second electronic device, and a third user using a third electronic device. In a further example, a third thread may include the user of the electronic device, the first user, the second user, and the third user. These threads may be separate from one another to distinguish the threads although common users may exist between them. The various threads may be shown and may be viewed using a respective user interface of the IM application 135.

In a further example, according to the exemplary embodiments, the electronic device 100 may execute a VM application 140. Initially, the VM application 140 may be a sub-functionality of the voice communication functionality. That is, the VM application 140 may be a feature of the voice communication functionality. However, this is only exemplary and the VM application 140 may be a separate application used independent of the voice communication functionality. The VM application 140 may enable a further user contacting the user of the electronic device 100 to generate a VM message to be listened by the user of the electronic device 100 at a later time. For example, if the user of the electronic device 100 is unavailable for the voice communication functionality, the further user may be provided with an option to leave a VM message for the user. The VM messages left and/or stored may be shown and may be listened to using a respective user interface of the VM application 140.

In yet another further example, according to the exemplary embodiments, the electronic device 100 may execute an integration application 145. The integration application 145 may generate a single user interface for a plurality of conversations that incorporates the thread of IM messages in the IM application 135 and inserts related VM messages in the VM application 140. As will be described in further detail below, the integration application 145 may determine a variety of parameters particularly regarding metadata associated with each IM message and VM message to determine a conversation and which messages are to be included therein and an order in which to incorporate the messages in the conversation.

It should be noted that the above noted applications, each being an application (e.g., a program) executed by the processor 105, is only exemplary. The functionality associated with the applications may also be represented as a separate incorporated component of the team service device 100 or may be a modular component coupled to the team service device 100, e.g., an integrated circuit with or without firmware.

The memory 110 may be a hardware component configured to store data related to operations performed by the electronic device 100. Specifically, the memory 110 may store data related to the IM application 135, the VM application 140, and the integration application 145. For example, the IM messages of the IM application 135 and the VM messages of the VM application 140 along with any associated metadata may be stored in the memory 110. The data may be stored in the memory 110 at least temporarily such as until a determination is made as to how the messages are to be incorporated into a conversation via the integration application 145.

The display device 115 may be a hardware component configured to show data to a user while the I/O device 120 may be a hardware component that enables the user to enter inputs. For example, the display device 115 may enable the user to view the various user interfaces of the IM application 135 and the VM application 140. The display device 115 may also enable the user to view the single user interface of the integration application 145 for a given conversation. In another example, the I/O device 120 may enable the IM messages and the VM messages to be generated. It should be noted that the display device 115 and the I/O device 120 may be separate components or integrated together such as a touchscreen. The transceiver 125 may be a hardware component configured to transmit and/or receive data in a wired or wireless manner. The transceiver 125 may operate on a variety of different frequencies or channels (e.g., set of consecutive frequencies) that are related to the functionalities of the different applications being performed.

It should again be noted that the exemplary embodiments are described herein with regard to IM messages that are text based and VM messages that are voice based. However, the exemplary embodiments may further incorporate various different formats of messages to be used in a conversation and integrated therein via the integration application 145. It should also be noted that the exemplary embodiments are described herein with regard to the operations being performed on the electronic device 100 while only the transfer of the messages and data is performed via the network to which the electronic device 100 has established a connection. However, this is only exemplary and the operations related to the IM application 135, the VM application 140, and/or the integration application 145 may at least partially be performed on a different electronic device such as a network component. In a first example, a predetermined number of recent IM messages may be stored locally on the memory 110 so that they may be readily available. However, older IM messages may be stored remotely such as on a network database. In a second example, VM messages may be stored remotely until requested for listening by the user of the electronic device 100. Thus, the VM message may be retrieved from the network database and stored at least temporarily locally on the memory 110. In a third example, the integration application 145 and its functionalities may be performed remotely such that the integration application 145 on the electronic device 100 only provides the user interface. That is, the integrated conversations may be viewed/listened by the user on the electronic device 100 but the operations for determining the integration may be performed elsewhere.

It should also be noted that the incorporation of the IM application 135 and the VM application 140 by the integration application 145 is only exemplary. The exemplary embodiments may also be used where the integration application 145 already performs all the functionalities of the applications being incorporated for the conversations. Accordingly, the use of the IM application 135 and the VM application 140 as separate applications that individually perform its respective functionalities is only exemplary. In another exemplary embodiment, the electronic device 100 may only include and execute the integration application 145 that performs all the above described operations and functionalities. In a further exemplary embodiment, the IM application 135 and/or the VM application 140 may be updated to incorporate the functionalities described herein of the integration application 145.

According to the exemplary embodiments, the integration application 145 may generate conversations including an IM thread from the IM application 135 and appropriately inserting VM messages from the VM application 140 into the IM thread. Accordingly, the integration application 145 may utilize the IM threads of the IM application 135 as a basis in which to generate the conversations. For example, when the integration application 145 is initially executed, conversations may automatically be generated using the IM threads of the IM application 135 as the basis. However, it should be noted that the use of the IM threads as a basis is only exemplary. In other exemplary embodiments, the integration application 145 may use any basis in which to generate the conversation. For example, the conversation may be manually generated such as based upon one or more users to be included. In another example, the conversation may be generated based upon other messages such as the VM messages.

Figure 2:
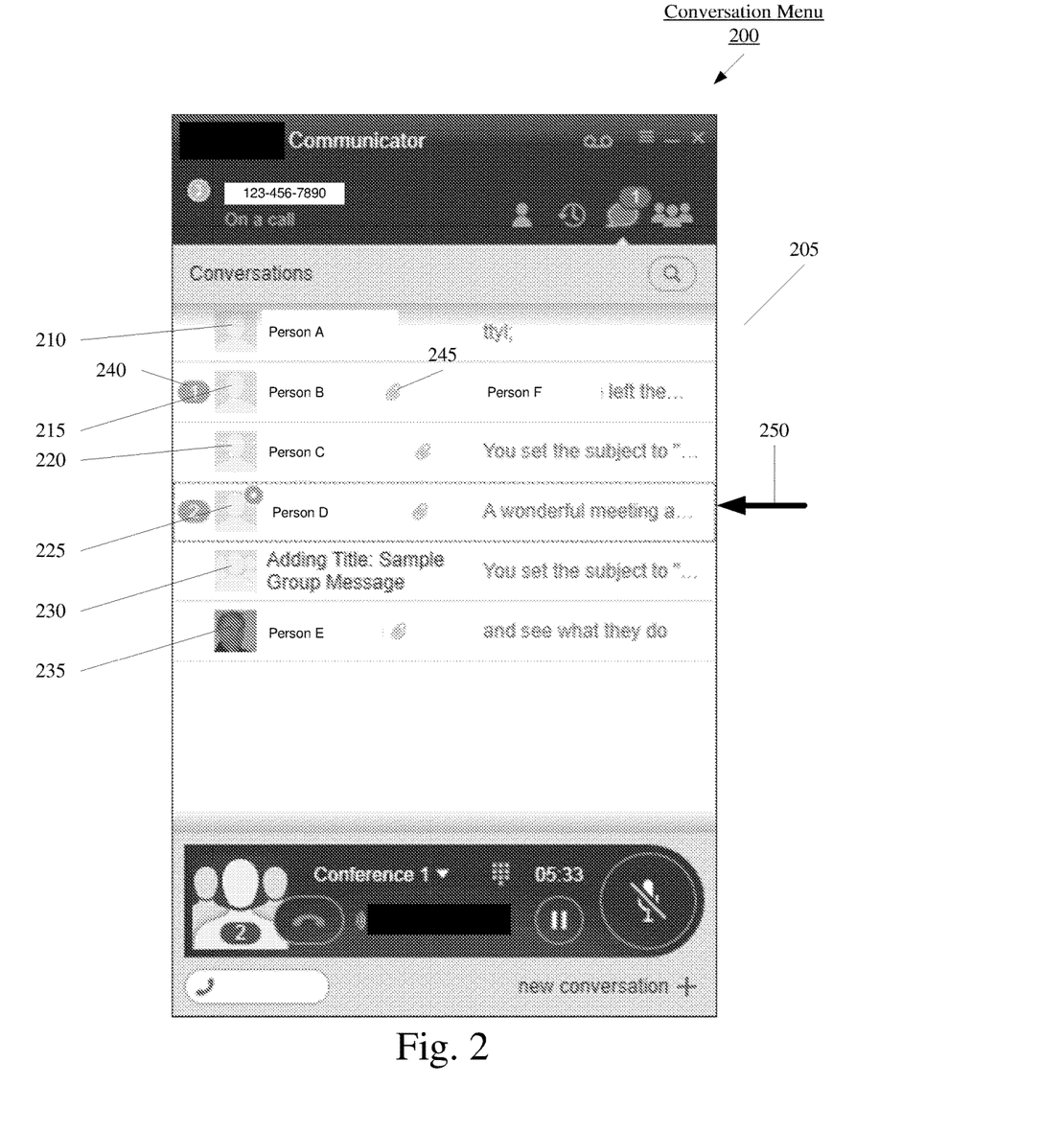
FIG. 2 shows an exemplary conversation menu according to the present invention.

FIG. 2 shows an exemplary conversation menu 200 according to the present invention. Specifically, the conversation menu 200 may represent a graphical user interface of the integration application 145 that provides a list 205 of all conversations in which the user of the electronic device 100 is involved. The list 205 of the conversations may increase as more conversations may be included or decrease when the user of the electronic device 100 leaves a particular conversation or manually removes it. However, it should be noted that the conversations may be maintained until removed even if the user of the electronic device 100 is no longer a participant. In this manner, if the user of the electronic device 100 were to again become a participant, the conversation may be updated with messages (e.g., from a point when the user is again a participant, incorporating all messages when not a participant, etc.).

The list 205 is shown as including a plurality of conversations. For example, a first conversation 210, a second conversation 215, a third conversation 220, and a fourth conversation 225 may each include one further participant along with the user of the electronic device 100). In another example, a fifth conversation 230 may include two or more further participants along with the user of the electronic device 100. In yet another example, the list 205 may include a sixth conversation 235 including one further participant along with the user of the electronic device 100.

Each of the conversations 210-235 may include and show various identification information to distinguish the conversation from other conversations as well as indicate markers to illustrate any updates to the conversations. As illustrated, the conversations 210-235 may show the participant of the conversation. In a first example, the name of the participant may be included as is the case with the conversations 210, 215, 225, and 235. In a second example, the subject of the conversation may be included as is the case with the conversations 220 and 230. Each of the conversations may further show a most recent message or descriptive statement relating to the most recent message. For example, the conversations 210, 225, and 235 may include at least a portion of the actual message (e.g., when the message is text based such as the IM message). The portion of the actual message that is shown may be limited to a predetermined number of characters. In another example, the conversations 215, 220, and 230 may include a most recent action performed by a participant. More specifically, the conversations 220 and 230 may show an action related to the conversation while the conversation 215 may show an action related to the participants of the conversation. Accordingly, the conversation 215 may originally have had more three participants (including the user of the electronic device 100) but due to a participant leaving, only a single further participant remains, thereby changing the presentation of the participants for the conversation 215. As shown, each of the conversations 210-225 has a single further participant and accordingly has a feature that shows a single silhouette to indicate this aspect. The conversation 230 includes more than one further participant and accordingly has a feature that shows multiple silhouettes to indicate this aspect. Alternatively, an image of the participant may also be shown as is the case with the conversation 235.

In addition, the list 205 may include further markers to indicate updates to the conversations such as new message indicator 240 and attachment indicator 245. The new message indicator 240 may indicate a number of new pending messages that have not been read/listened. For example, the conversation 215 includes the new message indicator 240 that indicates one new message while the conversation 225 includes the new message indicator 240 that indicates two new messages. The attachment indicator 245 may indicate whether the conversation has any attachments or files included therein. The attachment or file may be any attachable file such as an image, an audio file, etc. When a new message including an attachment is included, the attachment indicator 245 may include a unique feature such as a different color to indicate this aspect.

It should be noted that the conversation menu 200 of the integration application 145 may include further features. In view of the IM application 135 and the VM application 140 being partially incorporated through the messages included into a conversation, the conversation menu 200 may further incorporate the functionalities of the various applications as well. For example, with the VM application 140 being a feature of the voice communication functionality, the conversation menu 200 may also incorporate this functionality. Further functionalities that may be incorporated include the exchange of IM messages directly via the integration application 145 without need for using the separate IM application 135, a contact list functionality, etc.

As will be described in further detail below, the integration application 145 may determine that one or more of the conversations 210-235 may relate to a VM message that is to be inserted. Accordingly, a first operation may be to determine which of the conversations relates to the VM message. As illustrated in FIG. 2, the integration application 145 may determine that a selection 250 is the conversation 225. It should also be noted that the selection 250 may only represent an operation that is performed by the integration application 145. That is, the selection 250 may not be a graphic used in the conversation menu 200.

Figure 3:
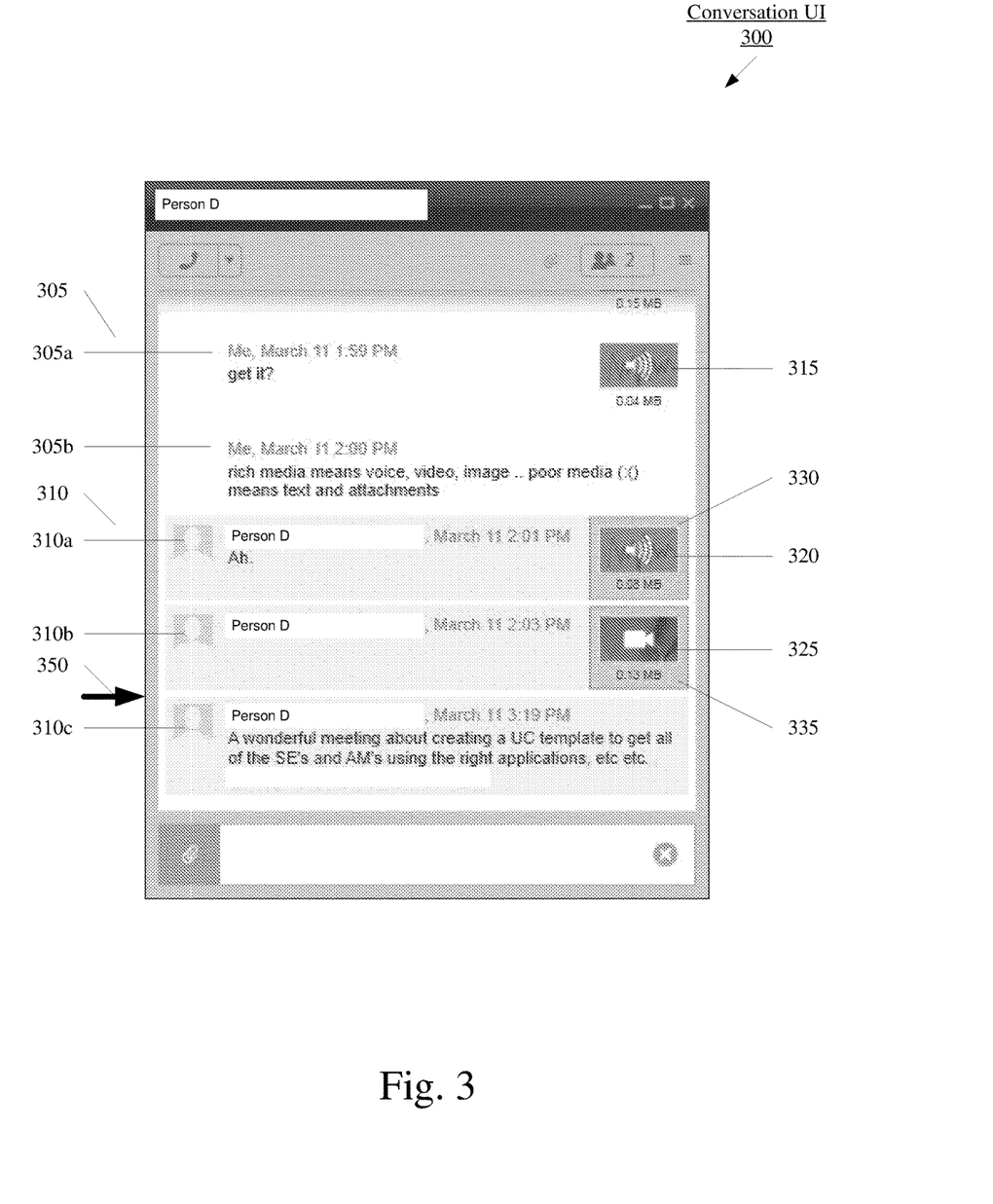
FIG. 3 shows an exemplary conversation user interface according to the present invention.

FIG. 3 shows an exemplary conversation graphical user interface 300 according to the present invention. Specifically, the conversation user interface 300 illustrates a representation of messages that are included in the conversation. The conversation user interface 300 may relate particularly to when the conversation 225 is selected from the conversation menu 200. As described above, the conversation 225 may include an IM thread from the IM application 135. Also as described above, the messages may include attachments. In addition, in accordance with the exemplary embodiments of the present invention, the selection 250 may have been determined for the conversation 225 such that an insertion 350 is determined within the thread. Accordingly, a second operation may be to determine where in the conversation the VM message is to be inserted. It is also noted that the insertion 350 may only represent an operation that is performed by the integration application 145 and may not be a graphic used in the conversation user interface 300.

The conversation user interface 300 may include a plurality of messages. As illustrated, the conversation 225 may include messages 305 from the user of the electronic device 100 and messages 310 from a further participant of the conversation. Specifically, the messages 305 may include messages 305a, b and the messages 310 may include messages 310a-c. The messages 305 and 310 may be imported from the IM application 135. However, it is again noted that this is only exemplary and the messages may be incorporated directly or through other indirect mechanisms. The conversation UI 300 also illustrates the attachments. For example, the message 305a may include a text component and an attachment 315. The attachment 315 may be an audio file as indicated through a graphic (e.g., audio outputting drawing) in an icon of the attachment 315. In another example, the message 310a may also include a text component and an attachment 320 while the message 310b includes only an attachment 325. The attachment 320 may also be an audio file as indicated through a common graphic as the attachment 315 whereas the attachment 325 may be a video file as indicated through a different graphic (e.g., camcorder drawing). Further attachments may include an image file as indicated through a further graphic (e.g., camera drawing).

It is also noted that the conversation user interface 300 may have been opened at a time subsequent to the conversation menu 200 shown in FIG. 2. Specifically, the further participant may have transmitted another message prior to the user of the electronic device 100 selecting the conversation 225 for viewing the conversation user interface 300. Accordingly, the messages 310 including three messages 310a-c may all be unread/unviewed/unlistened. As such, these messages 310 may have an unread indicator (e.g., bordered or highlighted). The attachments may also include an unread indicator such as indicator 330 for the attachment 320 and indicator 335 for the attachment 325.

The conversation user interface 300 may represent an IM thread that also includes attachments. That is, other media formats may be associated and included in the IM thread as IM messages or a part thereof. The integration application 145 according to the exemplary embodiments is further configured to determine and insert VM messages within this IM thread. For example, a VM message may be received by the electronic device 100 that is analyzed and determined to correspond to the conversation 225 of the conversation user interface 300. The VM message may further be determined as to a position within the conversation to be inserted such that a temporal correlation is determined for appropriate inclusion.

The integration application 145 according to the exemplary embodiments may determine a relation of a VM message to a conversation and its appropriate insertion into the conversation based upon a temporal correlation. That is, the integration application 145 may determine where to best integrate VM messages into related conversations. Specifically, the integration application 145 may identify if the VM message is associated with an existing conversation in the conversations of the conversation menu 200 (as described above as the first operation of the integration application 145) and to visually link the VM message into the conversation while preserving the temporal relationship of all messages in that associated conversation (as described above as the second operation of the integration application 145). As described above, the integration application 145 may correlate the VM messages into the conversation including an IM thread through metadata corresponding to the conversation and metadata corresponding to the VM message. Therefore, through integration of the VM message into an identified thread, a single user interface may be provided for a conversation that incorporates the different messages in the various formats.

Initially, it is noted that the metadata described herein is only exemplary and the integration application 145 may utilize any metadata for its functionalities. For example, the metadata considered for the conversation including the IM thread may be a number of participants in the conversation, identities of the participants in the conversation, a date and time for each message within the conversation that was sent/received, a subject of the conversation, etc. The metadata considered for the VM messages may be a number of parties, an identity of the sending party, one or more identities of the receiving participants', a date and time for when the VM message was left, a VM message length/duration, etc. Accordingly, those skilled in the art will understand that the metadata used herein may relate to any descriptive parameter of the corresponding message.

The integration application 145 may correlate the metadata of the conversation and the metadata of the VM message using a variety of different techniques such as multi-dimensional analysis. For example, a type of metadata may be mapped to a dimension. Possible dimensions may include the date and time messages were transmitted, a set of participants in a message and the duration in unit time of the message, etc. The resulting correlation may be used to identify a best fit for the VM message as a message within existing conversations. Therefore, the integration application 145 may determine any intersections in this dimensional analysis (e.g., intersection in content, intersection in time, intersection in people, etc.) to initially identify any possible relation to an existing conversation and subsequently to its temporal position within this conversation. However, if no such nexus exists from the multi-dimensional analysis, the integration application 145 may begin a new conversation in the conversation menu 200. Thus, the new conversation may begin with the VM message having no nexus. Alternatively, the integration application 145 may not utilize the conversation menu 200 but instead only allow the VM application 140 to be used. In this manner, the metadata may be used as the basis in which the association and the temporal correlation are determined between existing conversations and new VM messages. It should be noted that when the integration application 145 does not determine a nexus, the integration application 145 may still determine a match at a subsequent time when such a conversation is determined to be related. Accordingly, the VM message may be brought into this conversation.

The integration application 145 may further utilize other mechanisms beyond the metadata analysis that may provide additional information to increase or decrease a confidence of the determination from the metadata analysis. For example, the metadata may be enhanced based upon knowledge of the applications being used coincidentally by a user when the VM message is left. As discussed above, the VM application 140 may be a feature of a voice communication functionality. Thus, if the VM message is a result of an escalation from an IM message to a call, a global call identifier (GCID) may be obtained from the VM message and associated with both the IM message and the VM message. If the GCID is unavailable, the metadata of the IM message may be enriched by noting the application that the user was using when making the call that resulted in the VM message being generated. For example, if a user is looking an IM message and then initiates a call, associating the subject of the IM to the VM message may enable correlating the VM message to an IM message thereby to an IM thread and ultimately to a conversation. There may be other call identifiers or identifiers in general that may be utilized such as a call back request identifier, call forwarding identifier, an action or event identifier, etc. In another example, the integration application 145 may incorporate other mechanisms that provide analysis to increase or decrease a confidence of the determination from the metadata analysis. For example, speech analytics or text comprehension mechanism may be used to further provide information used in correlating a VM message to existing conversations. In a further example, previous interactions with the integration application 145 may be used in adjusting a confidence of the determination from the metadata analysis. For example, an input to an analysis done by the integration application 145 may be affected by the result of past correlations as well as and user acknowledgments of whether past correlations were accurate. It is also noted that the confidence value may be context-less confidence values when no history or communication patterns and modalities between users is known or context-based confidence values that facilitate the learning of threshold values specific to a set of communicating users. Accordingly, this may also be included in determining the confidence values and thresholds.

The results of the multi-dimensional analysis may determine that there are multiple conversations that have similar or common probabilities of association for a VM message. That is, a substantially equal or equal confidence value for association to more than one of the conversations may result from the analysis. Accordingly, the further considerations may be used. Nevertheless, more than one conversation may still result as a possible association for the VM message. When such a scenario arises, the VM message may have a recommendation tag that lists a set of existing conversations with which the VM message may be associated. The association list may be ordered by ranking (e.g., probability or confidence) and/or have a statistical probability of associated listed therewith. The VM message may be placed in the conversation with the highest correlation. However, the visibility of the VM message may be restricted to the receiving user or users of the VM message. When a user has access to the VM message included in an existing conversation and reviews the VM message, further actions may be performed on the recommended association. For example, a first action may be to reassign the VM message to a lower ranked conversation. In another example, a second action may be to accept the recommendation and associate the VM message with the conversation such that it is visible to all participants of the conversation.

It should be noted that the above description relates to an operation relative to the user of the electronic device 100. However, the integration application 145 and its use on a plurality of devices may include various features as well. That is, these features may relate to an operation such as distribution of messages to multiple devices when the conversation includes more than two participants. For example, each participant may have a respective conversation thread for VM messages. Accordingly, each participant's VM messages may not be visible to any other participant and are unrelated to each other. Therefore, although potentially part of a common conversation and inserted into the conversation where the conversation includes more than two participants, the VM message may have only been directed to one of the participants such that the VM message only appears in the intended participant's conversation thread. In contrast, a VM message sent to multiple participants may have a copy of the VM message inserted in each of the intended participants' conversation. It should be noted that the term "copy" represents an operation that enables the VM message to be provided accordingly. That is, a copying operation is note required for the actual VM message to be made N times for N participants of a conversation. In another type of operation, a VM message may be reference counted and its correlation to conversation participants may be retained along with a single copy of the VM message. It is also noted that the copy operation may also relate to copy of the metadata associated with the VM message being inserted into the conversation.

In another exemplary feature according to the exemplary embodiments, the integration application 145 may insert the VM message at an end of a conversation for each new VM message directed to an individual participant. The integration application 145 may enable a reply to be made to the VM message via an IM message. This may result in the integration application 145 initiating a new conversation. For example, the participants may not be common to the conversation in which the VM message was originally inserted (e.g., due to a narrower intended audience of the VM message relative to the participants of the original conversation). The original VM message may also be linked to the ensuing new conversation. In this manner, a new conversation may be started as the metadata may be analyzed to include a connector to another conversation but ultimately results in the new conversation and new thread. It is noted that when there is a narrower intended audience, the VM message may only be provided to these members while other members who may be part of an original conversation are omitted from being provided the VM message.

Figure 4:
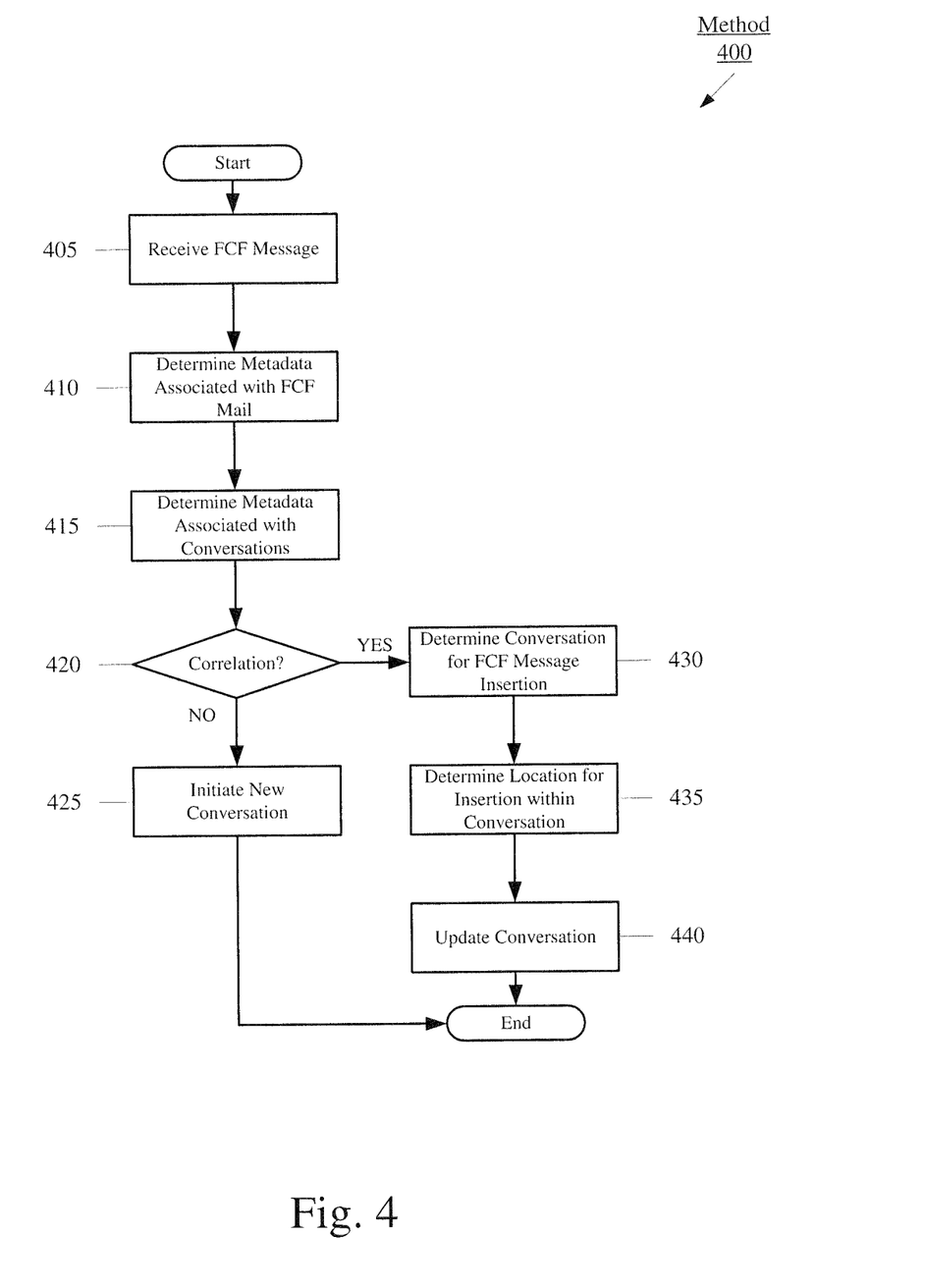
FIG. 4 shows an exemplary method for inserting a message in a first communication format into a conversation according to the present invention.

FIG. 4 shows an exemplary method 400 for inserting a message in a first communication format (FCF) into a conversation including thread of messages in a second communication format (SCF) according to the present invention. Specifically, the method 400 may relate to an execution of the integration application 145 so that a conversation is shown on a single user interface where the conversation includes messages of various formats that would otherwise require multiple user interfaces from separate applications. For example, the FCF message may be a VM message and the thread may be an IM thread. The method 400 will be described with regard to the electronic device 100 of FIG. 1, the conversation menu 200 of FIG. 2, and the conversation user interface 300 of FIG. 3. Although the method 400 is described with particular reference to VM messages and IM messages, it should again be noted that this is only exemplary.

In step 405, the electronic device 100 receives a FCF message such as a VM message. As discussed above, the VM message may be received in a variety of different manners at a variety of different times. For example, although the voice communication functionality was intended to be used for a real-time communication, the user of the electronic device 100 may have been unavailable or opted to not answer the incoming call. Accordingly, the other party may have been redirected to the VM application 140 to leave the VM message. In another example, a participant in an IM thread may have escalated into the use of the VM message such that the VM message was generated and transmitted. Also as discussed above, the VM message may be stored locally on the memory 110 and/or retrieved from a remote database.

In step 410, the integration application 145 determines the metadata associated with the FCF message. In step 415, the integration application 145 determines the metadata associated with the existing conversations. Initially, the FCF messages and the conversations may have metadata generated and associated therewith. With regard to the VM message, the metadata may be gathered and generated at the time the VM message is created. Accordingly, the VM message may have metadata associated therewith for analysis by the integration application 145. With regard to the conversations, the metadata may be imported when the conversation is created by the IM application 135 and/or gathered/generated when the conversation is created. It should be noted that the metadata may also be updated during the life of the conversation. Thus, if new messages in any format are included in the conversation, the metadata may be updated. New messages added to a conversation may also have metadata updated. That is, the metadata of the new message may be updated based upon the metadata of the conversation to which it is added.

In step 420, the integration application 145 determines whether the FCF message correlates to any of the existing conversations based upon the metadata of each. As discussed above, the integration application 145 may utilize a multi-dimensional analysis in which intersections may be determined between the metadata and the components thereof for the VM message and the existing conversations of the conversation menu 200. However, it should again be noted that the use of the multi-dimensional analysis is only exemplary and any mechanism may be used to determine the correlation. Also as discussed above, the correlation analysis may be based upon probability values, confidence values, etc.

If the integration application 145 determines that the FCF message does not correlate to any of the existing conversations in the conversation menu 200, the integration application 145 may continue the method 400 to step 425. For example, the confidence values of the VM message to each of the conversations in the conversation menu 200 may be below a predetermined confidence value that would otherwise be indicative of a correlation. In step 425, the integration application 145 initiates a new conversation for the VM message. Accordingly, the new conversation may include common metadata as the VM message. It should again be noted that the creation of a new conversation in the conversation menu 200 is only exemplary. In this scenario, the integration application 145 may simply allow the VM message to be created on the VM application 140.

Returning to step 420, if the integration application 145 determines that the FCF message correlates to one of the existing conversations in the conversation menu 200, the integration application 145 may continue the method 400 to step 430. For example, the confidence values of the VM message may be greater than the predetermined confidence value to at least one of the existing conversations. In step 430, the integration application 145 determines one of the existing conversations in the conversation menu 200 in which the VM message is to be inserted.

As discussed above, the integration application 145 may determine more than one conversation in which this condition for the confidence value is satisfied. When such a scenario exists, the integration application 145 may select one of the conversations based upon a variety of different mechanisms. For example, the conversation having the highest confidence value correlation may be selected.

In step 435, the integration application 145 may determine a location in which the FCF message is to be inserted into the selected existing conversation. As discussed above, the metadata may again be utilized (along with other pertinent information that may be determined) to determine how the VM message is to be inserted. For example, the selected existing conversation may be the conversation 225 in the conversation menu 200. The VM message may have been received with metadata associated therewith, particularly a date and time that indicates March 11 at a time after 2:03 PM and before 3:19 PM. Accordingly, the VM message may be determined to be inserted between messages 310b and 310c to maintain the temporal correlation of the VM message relative to the other messages in the conversation 225. Thus, in step 440, the conversation is updated by inserting the VM message therein.

When multiple conversations satisfy the correlation criteria, the integration application may update the conversation with further options such as enabling the user to accept or decline the automatic insertion of the VM message. Further options may be provided to the user to manually affect the manner in which the automatic performance of the integration application 145 is used.

The exemplary embodiments provide a device and method of temporally correlating communication types or formats into a single user interface. While separate applications may provide individual, respective user interfaces for the different types of communication formats such as IM messages and VM messages, a more efficient mechanism is to provide a single user interface so that all messages correlated to a single conversation are included therein to minimize an overall operation to read or listen to all messages in that conversation. The exemplary embodiments utilize metadata of these messages in the different communication formats to generate a single user interface including all these messages therein.

In a particular exemplary embodiment, the temporal correlation of the communication formats may be used in a contact center or customer service center. For example, the contact center or customer service center may provide services in which multiple agents thereof are assigned to handling the service. In the efforts to complete the service or a portion thereof, the agents may communicate with one another via the different communication formats that are available. Because the messages are related to a single conversation related to handling the service, the exemplary embodiments may provide a single user interface in which the messages may be reviewed. This single user interface may subsequently be stored for a transaction history along with other artifacts. The single user interface may also enable a supervisor to review the transaction including a progress thereof. However, it is noted that a user such as the supervisor may be provided this review capability but may not be shown as a member of the conversation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a Windows OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   receiving, by a first electronic device, a first message in a first communication format from a second electronic device, the first message having first metadata associated therewith;
   determining, by the first electronic device, respective second metadata associated with existing conversations, the existing conversations each including a plurality of existing messages in at least one second communication format, the existing messages being a thread in a temporal order, the existing conversations being shown in a single, respective user interface of the first electronic device;
   determining, by the first electronic device, a correlation between the first message and one of the existing conversations based upon the first and second metadata; and
   inserting, by the first electronic device, the first message in between the existing messages of the one of the existing conversations shown in the user interface that maintains the temporal order.

2. The method of claim 1, wherein the first communication format corresponds to a voice mail (VM) message and the at least one second communication format corresponds to an instant messaging (IM) message.

3. The method of claim 1, wherein the first metadata being indicative of first descriptive parameters of the first message and wherein the first metadata includes a number of participants in the first message, an identity of a sending participant, at least one identity of a receiving participant, a date the first message is created, a time the first message is created, a length of the first message, a duration of the first message, a global call identifier (GCID) of the first message, and a combination thereof.

4. The method of claim 1, wherein the second metadata being indicative of second descriptive parameters of the second message and wherein the second metadata includes a number of participants in the conversation, identities of participants in the conversation, a date each of the messages is created, a time each of the messages is created, a subject of the conversation, a GCID of the existing messages, and a combination thereof.

5. The method of claim 1, wherein the correlation is determined based upon a confidence value determined for the first message relative to the one of the existing conversations and a predetermined confidence value, the correlation being satisfied when the confidence value is greater than the predetermined confidence value.

6. The method of claim 5, wherein another one of the existing conversations satisfies the correlation.

7. The method of claim 6, further comprising:
generating, by the first electronic device, an input for manual selection to accept the inserting of the first message in the one of the existing conversations when the another one of the existing conversations is determined to satisfy the correlation.

8. The method of claim 5, wherein the first message fails to satisfy the correlation by the confidence value being less than the predetermined confidence value, the method further comprising:
generating a new conversation for the first message.

9. The method of claim 1, wherein the existing messages correspond to a text message, a voice message, a video message, a picture message, a document message, and a combination thereof.

10. The method of claim 1, wherein the integration device is a component of one of a call center and a customer service center.

11. An electronic device, comprising:
a transceiver configured to establish a connection to a network; and
a processor configured to receive a first message in a first communication format from a second electronic device, the first message having first metadata associated therewith, the processor configured to determine respective second metadata associated with existing conversations, the existing conversations each including a plurality of existing messages in at least one second communication format, the existing messages being a thread in a temporal order, the existing conversations being shown in a single, respective user interface of the first electronic device, the processor configured to determine a correlation between the first message and one of the existing conversations based upon the first and second metadata, the processor configured to insert the first message in between the existing messages of the one of the existing conversations shown in the user interface that maintains the temporal order.

12. The integration device of claim 11, wherein the first communication format corresponds to a voice mail (VM) message and the at least one second communication format corresponds to an instant messaging (IM) message.

13. The integration device of claim 11, wherein the first metadata being indicative of first descriptive parameters of the first message and wherein the first metadata includes a number of participants in the first message, an identity of a sending participant, at least one identity of a receiving participant, a date the first message is created, a time the first message is created, a length of the first message, a duration of the first message, a global call identifier (GCID) of the first message, and a combination thereof.

14. The integration device of claim 11, wherein the second metadata being indicative of second descriptive parameters of the second message and wherein the second metadata includes a number of participants in the conversation, identities of participants in the conversation, a date each of the messages is created, a time each of the messages is created, a subject of the conversation, a GCID of the existing messages, and a combination thereof.

15. The integration device of claim 11, wherein the correlation is determined based upon a confidence value determined for the first message relative to the one of the existing conversations and a predetermined confidence value, the correlation being satisfied when the confidence value is greater than the predetermined confidence value.

16. The integration device of claim 15, wherein another one of the existing conversations satisfies the correlation.

17. The integration device of claim 16, wherein the processor is further configured to generate an input for manual selection to accept the inserting of the first message in the one of the existing conversations when the another one of the existing conversations is determined to satisfy the correlation.

18. The integration device of claim 15, wherein the first message fails to satisfy the correlation by the confidence value being less than the predetermined confidence value, the processor being further configured to generate a new conversation for the first message.

19. The integration device of claim 11, wherein the existing messages correspond to a text message, a voice message, a video message, a picture message, a document message, and a combination thereof.

20. A non-transitory computer readable storage medium with an executable program stored thereon of a first electronic device, wherein the program instructs a microprocessor to perform operations comprising:
receiving a first message in a first communication format from a second electronic device, the first message having first metadata associated therewith;
determining respective second metadata associated with existing conversations, the existing conversations each including a plurality of existing messages in at least one second communication format, the existing messages being a thread in a temporal order, the existing conversations being shown in a single, respective user interface of the first electronic device;
determining a correlation between the first message and one of the existing conversations based upon the first and second metadata; and
inserting the first message in between the existing messages of the one of the existing conversations shown in the user interface that maintains the temporal order.

* * * * *